(12) United States Patent
Odejerte, Jr. et al.

(10) Patent No.: US 10,192,379 B2
(45) Date of Patent: Jan. 29, 2019

(54) SYSTEM AND METHOD FOR MITIGATING RELAY STATION ATTACK

(71) Applicant: Huf North America Automotive Parts Mfg. Corp., Milwaukee, WI (US)

(72) Inventors: Antonio Odejerte, Jr., Farmington Hills, MI (US); John Nantz, Brighton, MI (US)

(73) Assignee: Huf North America Automotive Parts Mfg. Corp., Milwaukee, WI (US)

( * ) Notice: Subject to any disclaimer, the term of this patent is extended or adjusted under 35 U.S.C. 154(b) by 0 days.

(21) Appl. No.: 15/805,745

(22) Filed: Nov. 7, 2017

(65) Prior Publication Data
US 2018/0130275 A1 May 10, 2018

Related U.S. Application Data

(60) Provisional application No. 62/419,081, filed on Nov. 8, 2016.

(51) Int. Cl.
| | | |
|---|---|---|
| *G07C 9/00* | (2006.01) | |
| *H04W 12/12* | (2009.01) | |
| *G08C 17/02* | (2006.01) | |
| *B60R 25/24* | (2013.01) | |
| *H04W 4/70* | (2018.01) | |

(52) U.S. Cl.
CPC ........ *G07C 9/00309* (2013.01); *B60R 25/245* (2013.01); *G08C 17/02* (2013.01); *H04W 12/12* (2013.01); *B60R 2325/101* (2013.01); *B60R 2325/108* (2013.01); *G07C 2009/00412* (2013.01); *G07C 2009/00555* (2013.01); *H04W 4/70* (2018.02)

(58) Field of Classification Search
CPC ........ B60R 2325/101; B60R 2325/108; B60R 25/245; G07C 2009/00412; G07C 2009/00555; G07C 9/00309; G08C 17/02; H04W 12/12; H04W 4/70
USPC .................................. 340/5.1, 5.2, 5.6, 5.61
See application file for complete search history.

(56) References Cited

U.S. PATENT DOCUMENTS

| | | | | |
|---|---|---|---|---|
| 9,988,014 | B2* | 6/2018 | Parasurama | B60R 25/245 |
| 2010/0321154 | A1* | 12/2010 | Ghabra | B60R 25/00 340/5.61 |
| 2014/0132391 | A1* | 5/2014 | Eder | G07C 9/00309 340/5.21 |

* cited by examiner

*Primary Examiner* — Yong Hang Jiang
(74) *Attorney, Agent, or Firm* — Honigman Miller Schwartz and Cohn LLP; Matthew H. Szalach; Jonathan P. O'Brien

(57) ABSTRACT

A system for mitigating relay station attack in a wireless communication system is provided. The system may include a first wireless communication node and a second wireless communication node. The first wireless communication node is operable to transmit data including an encrypted transmit power value. The second wireless communication node is operable to receive the data, decrypt the encrypted transmit power value, and determine a received signal strength indication value of the data. The second wireless communication node may also be operable to compare the received signal strength indication value to the decrypted transmit power value and prevent communication between the first wireless communication node and the second wireless communication node based on the comparison between the received signal strength indication value and the decrypted transmit power value.

23 Claims, 8 Drawing Sheets

SYSTEM AND METHOD FOR MITIGATING RELAY STATION ATTACK

CROSS REFERENCE TO RELATED APPLICATION

Figure 1:
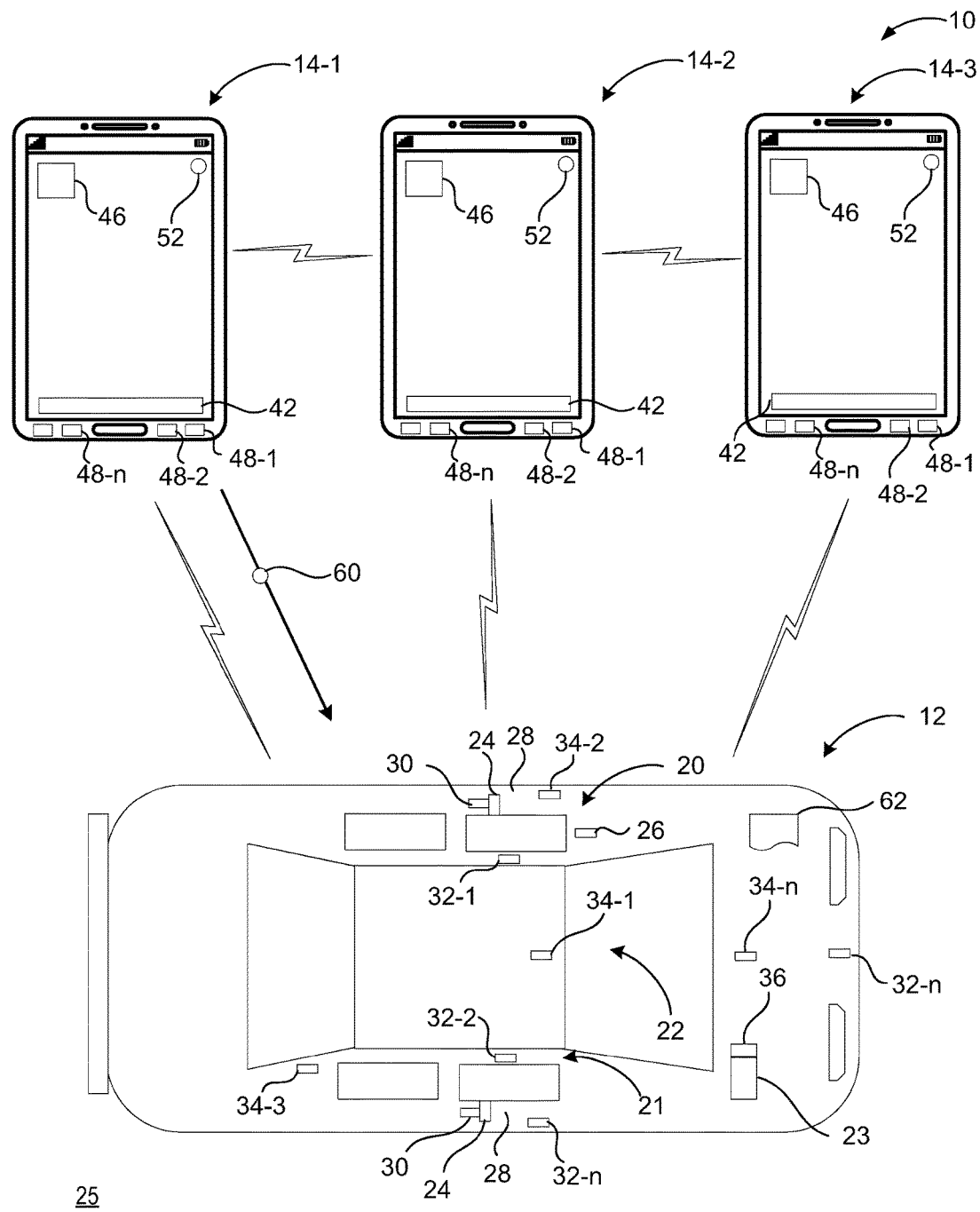
Figure 2A:
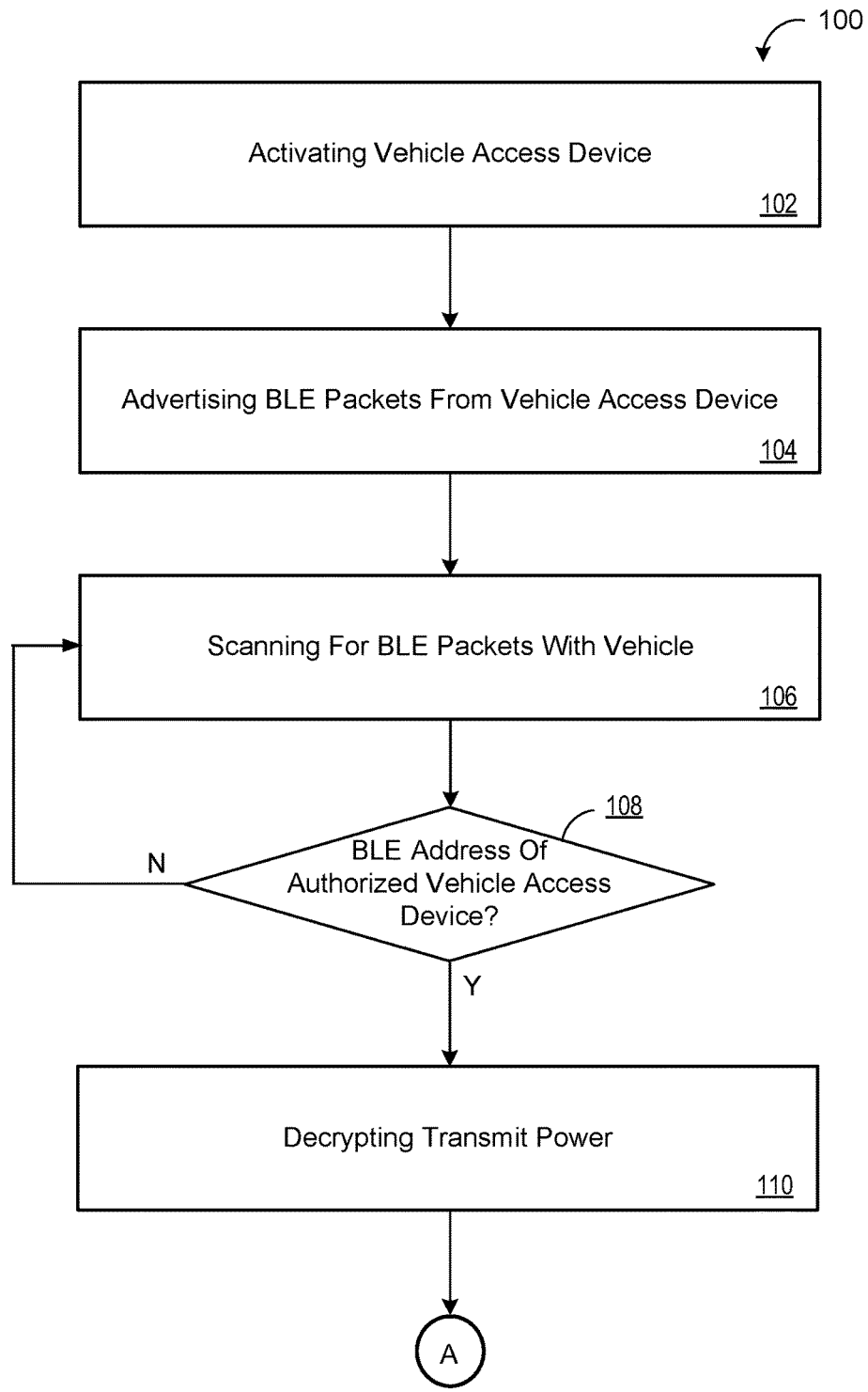
Figure 2B:
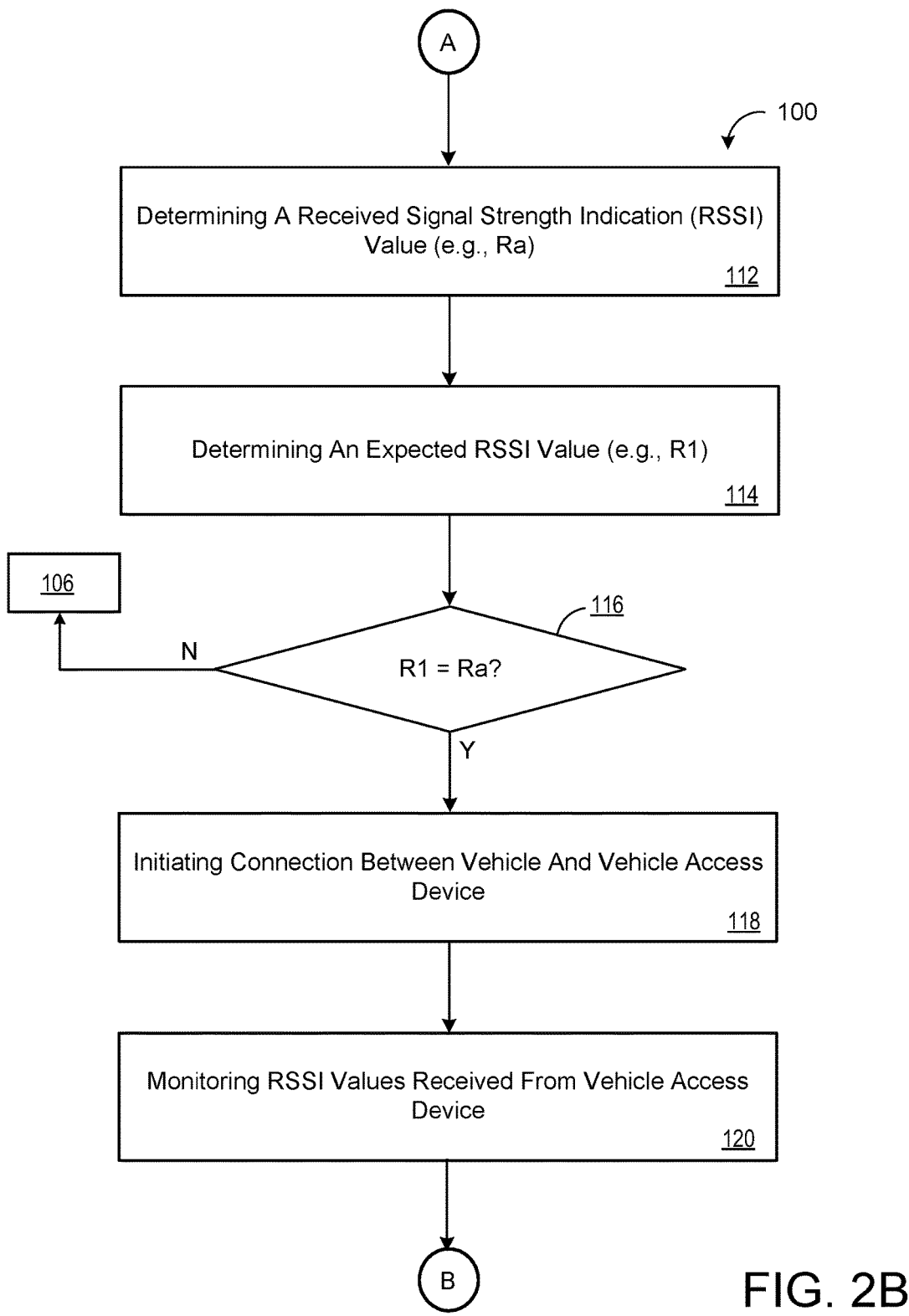
Figure 2C:
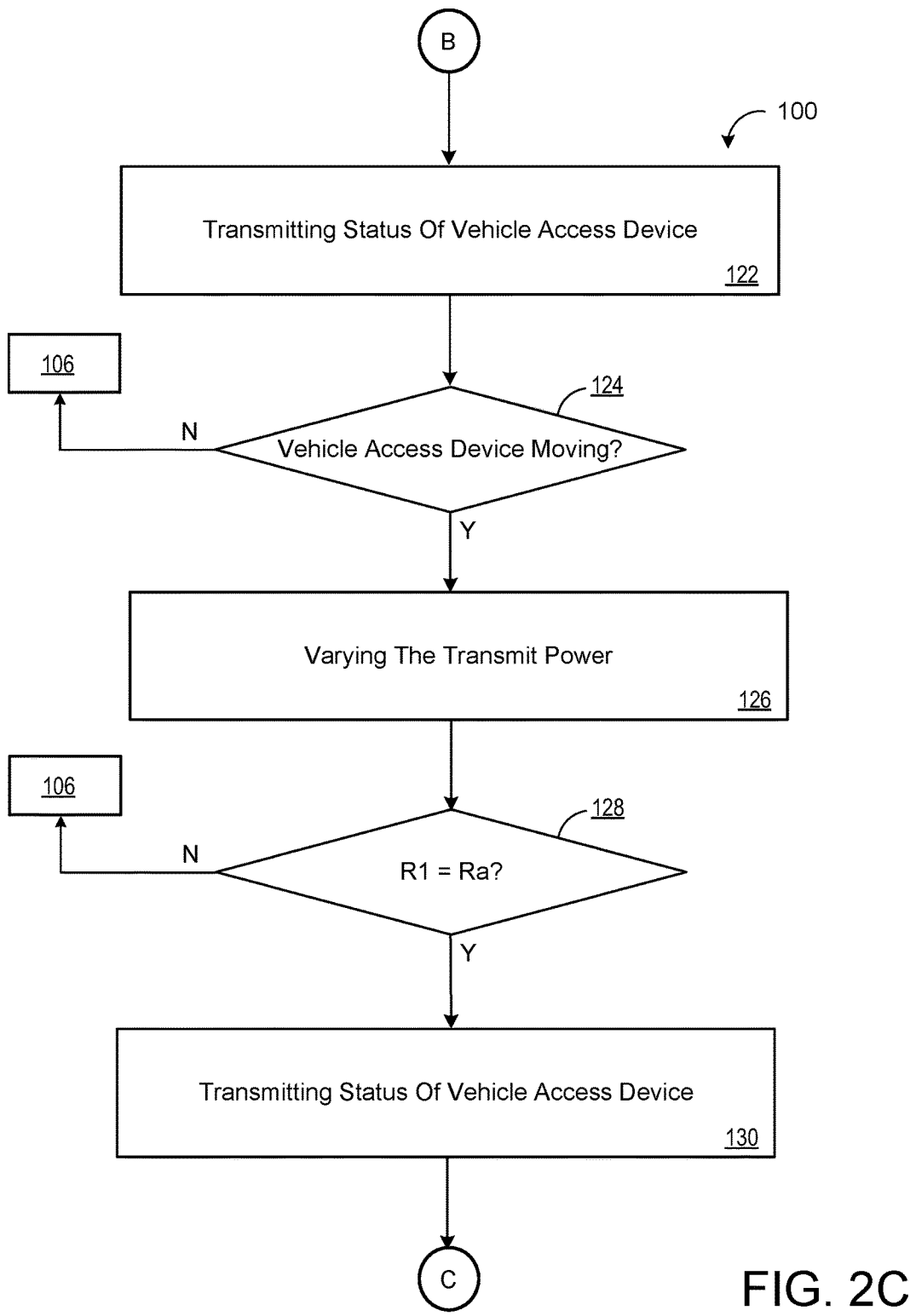
Figure 2D:
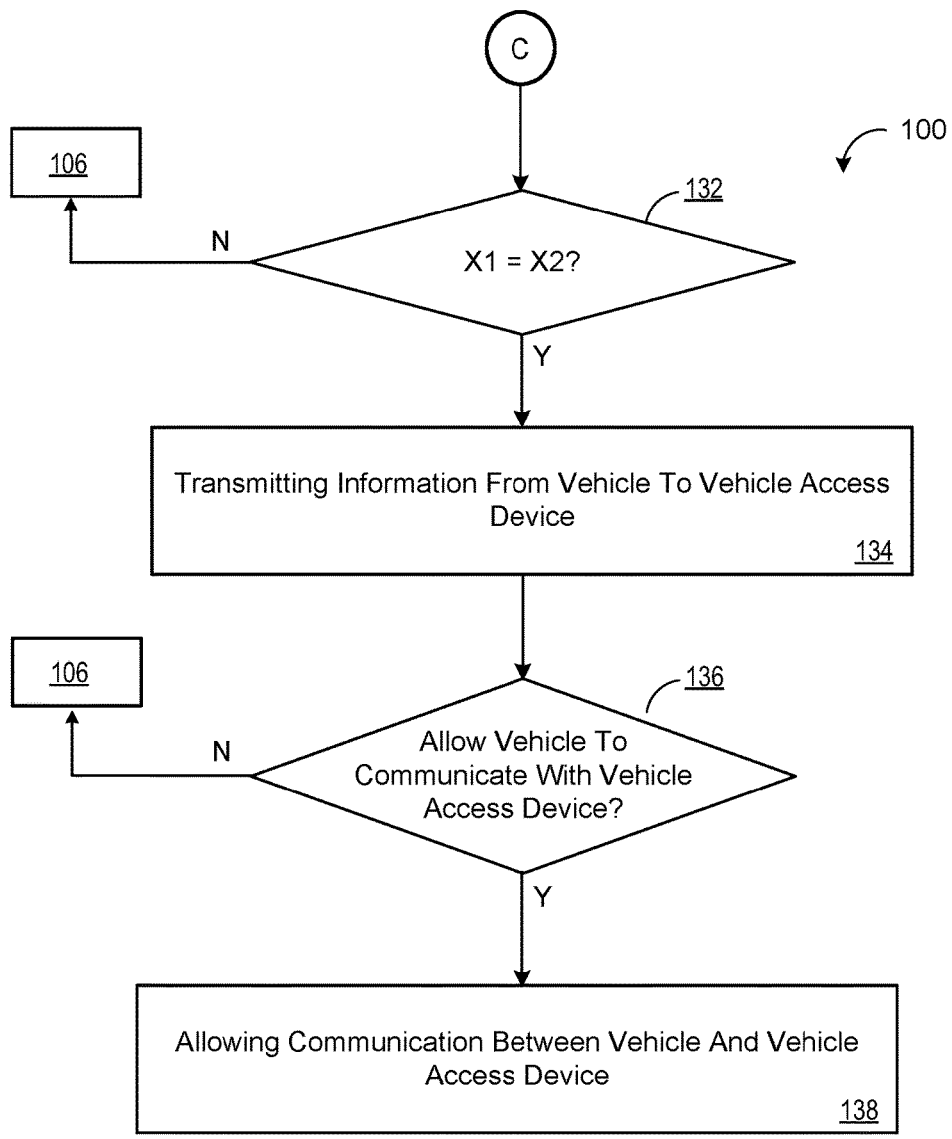

This application claims the benefit of U.S. Provisional Application Ser. No. 62/419,081, filed Nov. 8, 2016, the contents of which are incorporated herein by reference in their entirety.

FIELD

The present disclosure relates generally to a system and method for mitigating relay station attack and more particularly to a system and method for mitigating relay station attack in a BLUETOOTH® low energy communication system.

BACKGROUND

This section provides background information related to the present disclosure and is not necessarily prior art.

A wireless communication device, such as a smartphone, a smart watch, or a computer (e.g., a tablet, laptop, personal digital assistant, etc.), for example, can be used to communicate with a motor vehicle. For example, a wireless communication device can communicate with a vehicle in order to access, diagnose faults, start/stop, and/or provide power to certain components and/or systems within the vehicle. In particular, a user may utilize a wireless communication protocol (e.g., short-range radio wave communication, Wi-Fi, BLUETOOTH®, BLUETOOTH® low energy (BLE), near field communication (NFC), etc.) to access and/or operate the vehicle. For example, the operator may access and/or operate the vehicle by utilizing a wireless communication protocol controlled and powered by a smartphone.

Wireless communication systems, such as BLE, may be susceptible to security threats such as relay station attack, which can occur when one or more unauthorized wireless communication devices communicate with the vehicle. During a relay station attack, the unauthorized wireless communication devices may intercept, or otherwise receive, one or more wireless communications between a vehicle and an authorized wireless communication device. For example, a first unauthorized wireless communication device may intercept a wireless interrogation signal transmitted by the vehicle. The first unauthorized wireless communication device may transmit the interrogation signal to a second unauthorized wireless communication device. The second unauthorized wireless communication device may decode and retransmit the interrogation signal to the authorized wireless communication device. In response to the interrogation signal, the authorized wireless communication device may wirelessly transmit a response signal, including a validation code, to the second unauthorized wireless communication device. The second unauthorized wireless communication device may transmit the response signal, including the validation code, to the first unauthorized wireless communication device, and the first unauthorized wireless communication device may transmit the response signal and the validation code to the vehicle. Upon receipt of the response signal and the validation code from the first unauthorized wireless communication device, the vehicle may allow the first unauthorized wireless communication device to wirelessly instruct and control various aspects of the vehicle. For example, the vehicle may allow the first unauthorized wireless communication device to unlock the doors on the vehicle or start the engine of the vehicle. While known systems and methods for preventing relay station attack have proven acceptable for their intended purpose, a continuous need for improvement in the relevant art remains.

SUMMARY

This section provides a general summary of the disclosure, and is not a comprehensive disclosure of its full scope or all of its features.

According to one aspect, the present disclosure provides a system for mitigating relay station attack in a wireless communication system. The system may include a first wireless communication node and a second wireless communication node. The first wireless communication node is operable to transmit data including an encrypted transmit power value. The second wireless communication node is operable to receive the data, decrypt the encrypted transmit power value, and determine a received signal strength indication value of the data. The second wireless communication node may also be operable to compare the received signal strength indication value to the decrypted transmit power value and prevent communication between the first wireless communication node and the second wireless communication node based on the comparison between the received signal strength indication value and the decrypted transmit power value.

In some configurations, the first communication node includes a first BLUETOOTH® low energy node and the second wireless communication node includes a second BLUETOOTH® low energy node. The system may also include a vehicle access device having the first wireless communication node, and a vehicle having the second wireless communication node.

The vehicle may include a sensor operable to sense a condition in an area external to the vehicle and transmit the condition to a wireless communication node. The sensor may include a camera. The system may further include a first sensor operable to transmit a first status of the vehicle access device to the second wireless communication node. The first sensor may include one of an accelerometer, a gyroscope, and a micro-electromechanical system. The first status may include one of a speed and an acceleration of the vehicle access device.

In some examples, the first wireless communication node is operable to vary the value of the encrypted transmit power. The system may also include a second sensor operable to transmit a second status of the vehicle access device to the second wireless communication node. The second status may include a location of the vehicle access device. The second sensor may also include a global positioning system sensor.

According to another aspect, the present disclosure provides a method for mitigating relay station attack in a wireless communication system. The method may include transmitting data, including an encrypted transmit power value, from a first wireless communication node. The method may also include receiving the data at a second wireless communication node, decrypting the encrypted transmit power value, and determining a received signal strength indication value of the data. The method may also include comparing the received signal strength indication value to the decrypted transmit power value and controlling communication between the first wireless communication node and the second wireless communication node based on the comparison between the received signal strength indication value and the decrypted transmit power value.

In some configurations, transmitting data from a first wireless communication node includes transmitting data from a first BLUETOOTH® low energy node and receiving data at a second wireless communication node includes receiving data at a second BLUETOOTH® low energy node. Transmitting data from a first wireless communication node may include transmitting data from a first wireless communication node associated with a vehicle access device. Receiving data at a second wireless communication node may include receiving data at a second wireless node associated with a vehicle.

In some examples, the method includes sensing a condition in an area external to the vehicle and transmitting the condition to a wireless communication node. Sensing a condition in an area external to the vehicle may include photographing the area external to the vehicle. In some configurations, the method includes determining one of a speed and an acceleration of the vehicle access device. The method may further include varying the value of the encrypted transmit power. The method may also include transmitting a second status of the vehicle access device to the second wireless communication mode Transmitting a second status of the vehicle access device may include transmitting a location of the vehicle access device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Figure 3A:
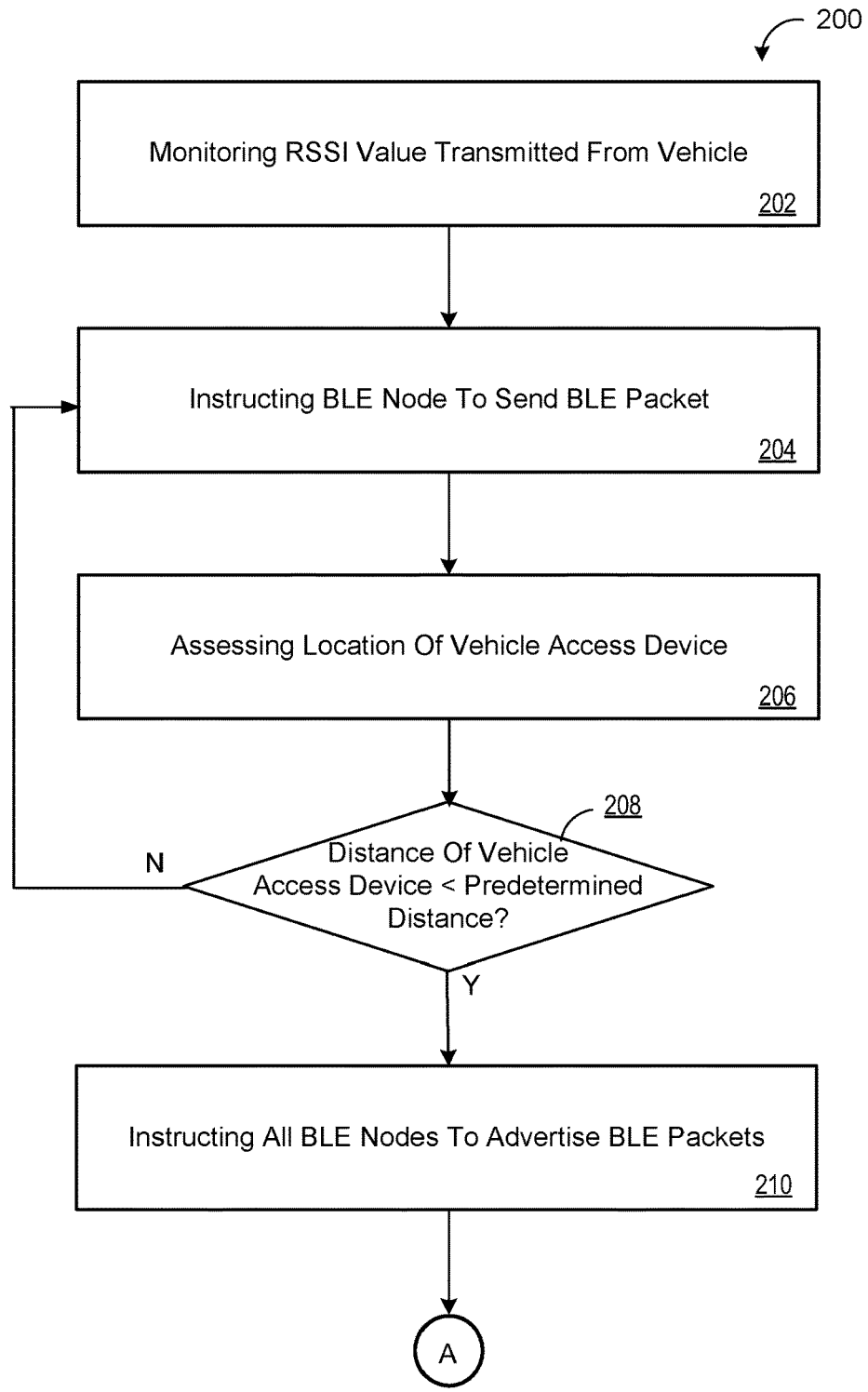
Figure 3B:
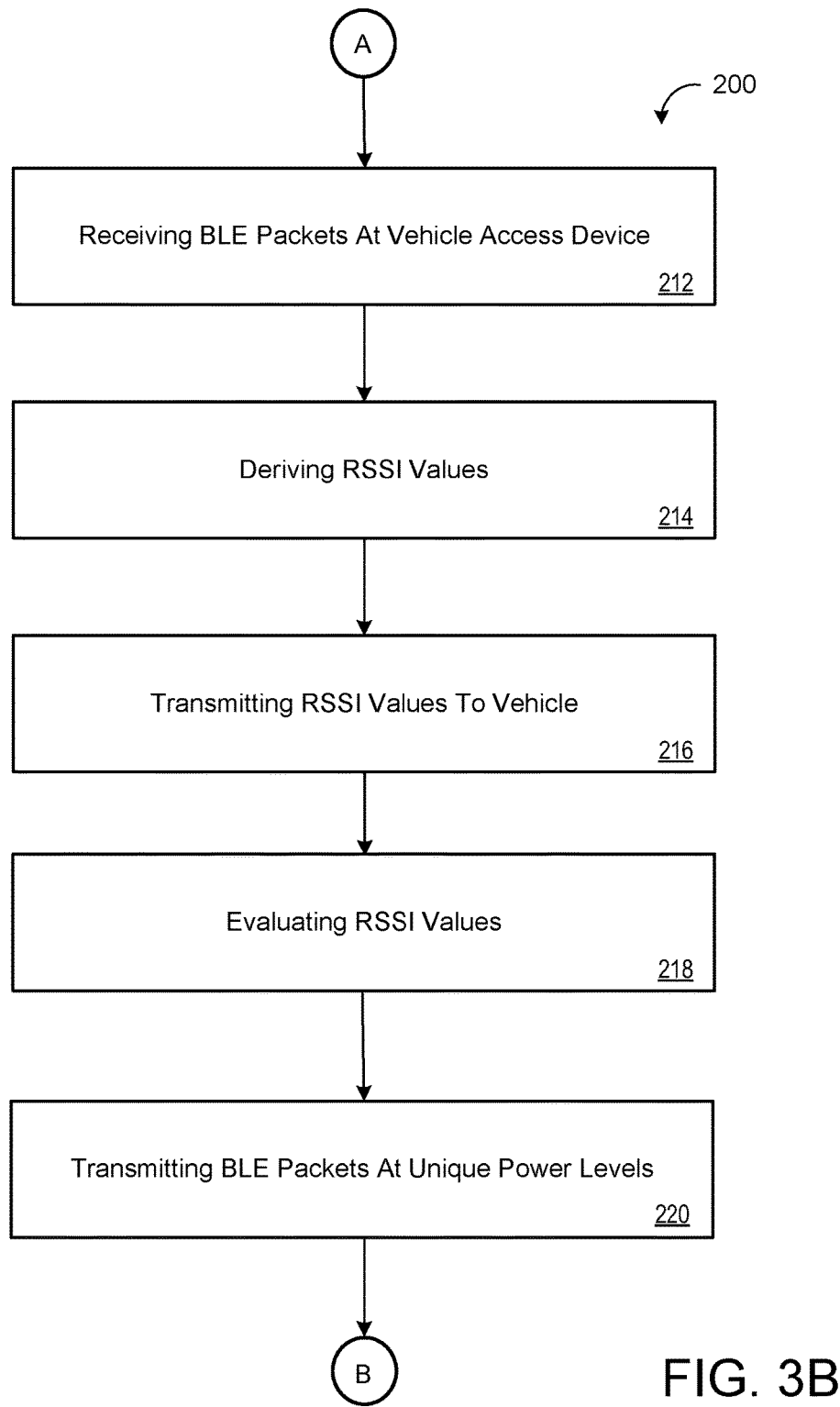
Figure 3C:
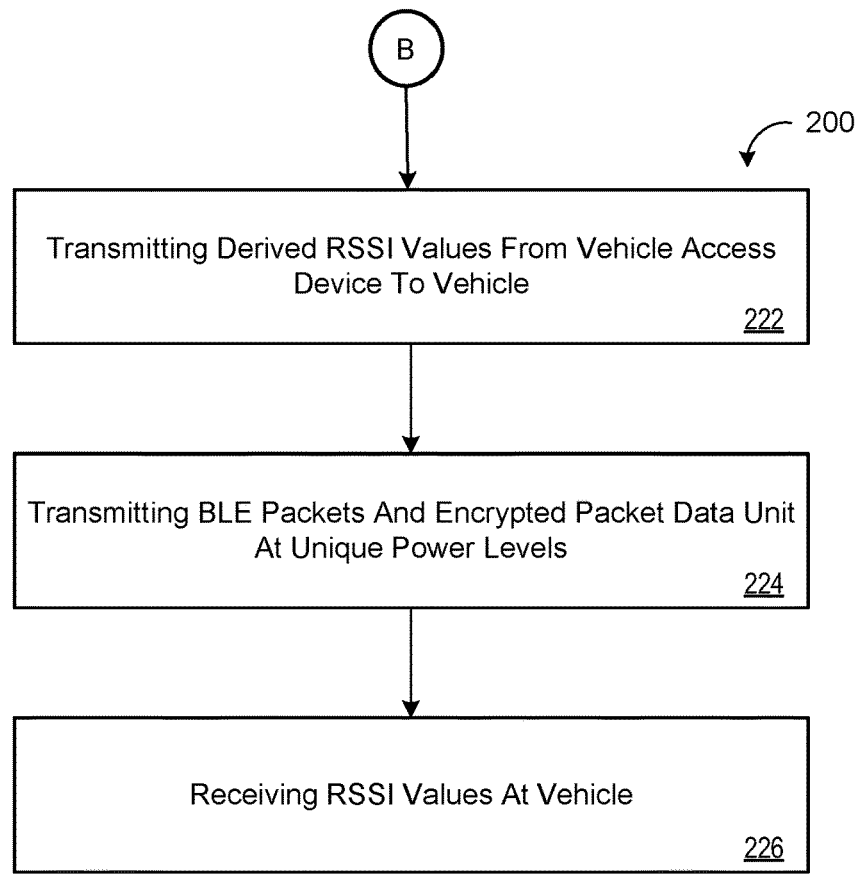

FIG. 1 is a functional block diagram of an example vehicle communication system according to the present disclosure;

FIGS. 2A-2D provide a flowchart depicting an example method of controlling a vehicle communication system according to the present disclosure; and FIGS. 3A-3C provide a flowchart depicting another example method of controlling a vehicle communication system according to the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

The description provided herein is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

With reference to FIG. 1, a communication system 10 for mitigating relay station attack is provided. The communication system 10 may include a vehicle 12 and one or more vehicle access devices 14-1, 14-2, ... 14-n. The vehicle 12 may be any known variety of motorized vehicle, such as a car, truck, or van, for example. In this regard, while the communication system 10 is generally shown and described herein relative to the vehicle 12, the communication system 10 may be used to mitigate relay station attack in other applications or systems.

The vehicle 12 may include an access system 20, a monitoring system 21, a communication system 22, and a control module 23. The access system 20 may include one or more locks 24, a locking module 26, and one or more doors 28 and/or other access location(s). The locks 24 may permit and/or prevent access to the vehicle 12 through the doors 28. For example, each door 28 of the vehicle 12 may include a lock 24 and a handle 30. In particular, the locking module 26 may communicate with the lock(s) 24 to permit and/or prevent operation of the handle 30 in order to permit and/or prevent access to the vehicle 12 through the doors 28. In this regard, the locking module 26 may receive a signal from the communication system 22 to control a state (e.g., locked or unlocked) of the lock(s) 24 based on a signal(s) received from one or more of the vehicle access devices 14-1, 14-2, ... 14-n.

The monitoring system 21 may include a one or more sensors 32-1, 32-2, ... 32-n disposed at various locations on or in the vehicle 12 for monitoring various conditions in an area 25 surrounding and/or external to the vehicle 12. For example, as illustrated in FIG. 1, the sensors 32-1, 32-2, ... 32-n may be is disposed on, or proximate to, the doors 28 of the vehicle 10. It will be appreciated, however, that the vehicle 10 may include various sensors 32-1, 32-2, ... 32-n disposed in other locations on the vehicle 10 within the scope of the present disclosure. The sensors 32-1, 32-2, ... 32-n may include any variety of sensing device that can monitor a condition(s) in the area 25 external to the vehicle 10. For example, the sensors 32-1, 32-2, ... 32-n may include a motion sensing device (e.g., a camera, a radar gun, etc.), an acoustic sensing device (e.g., a microphone), a temperature sensing device (e.g., a thermometer), etc., that can sense a condition(s) in the area 25 external to the vehicle 10.

The communication system 22 may include one or more wireless communication nodes 34-1, 34-2, ... 34-n and a communication application 36. In some configurations, the communication system 22 includes three wireless communication nodes 34-1, 34-2, ... 34-n. In particular, communication system 22 may include a primary wireless communication node 34-1, a first secondary communication node 34-2, and a second secondary communication node 34-3. It will be appreciated, however, that the communication system 22 may include more or less than three wireless communication nodes 34-1, 34-2, ... 34-n within the scope of the present disclosure. As illustrated in FIG. 1, the communication nodes 34-1, 34-2, ... 34-n may be located in various locations on and/or in the vehicle 12. For example, the primary wireless communication node 34-1 may be located on a body portion of the vehicle 12. The first and/or second communication nodes 34-2, 34-3, may each be located on one of the doors 28 of the vehicle 12.

As will be explained in more detail below, each wireless communication node 34-1, 34-2, ... 34-n may be configured to communicate with the other wireless communication node(s) 34-1, 34-2, ... 34-n. For example, the wireless communication nodes 34-1, 34-2, ... 34-n may communicate with one another, and with the vehicle access devices 14-1, 14-2, ... 14-n, through one or more wired and/or wireless communication protocols, such as LIN Communication, short-range radio wave communication, Wi-Fi, BLUETOOTH, and/or BLUETOOTH® low energy (BLE) (e.g., Mesh BLE). In this regard, the wireless communication nodes 34-1, 34-2, ... 34-n may be referred to herein as BLE communication nodes 34-1, 34-2, ... 34-n.

The BLE communication nodes 34-1, 34-2, ... 34-n may each include a BLE address (e.g., a major BLE address). In some configurations, each BLE communication node 34-1, 34-2, ... 34-n may include the same major BLE address. In this regard, the secondary BLE communication nodes 34-2, 34-3 may each include a minor BLE address. The minor BLE address of the secondary BLE communication node 34-2 may be different than the minor BLE address of the secondary BLE communication node 34-3. Accordingly, the minor BLE addresses can allow the secondary BLE communication nodes 34-2, 34-3 to be differentiated from each other and from the primary BLE communication node 34-1.

The communication application 36 may allow the vehicle 12 to communicate with the vehicle access devices 14-1, 14-2, ... 14-n through the BLE communication nodes 34-1, 34-2, ... 34-n. For example, the communication application 36 may implement a wireless communication protocol that allows the vehicle 12 to wirelessly send and receive messages to and/or from the vehicle access device 14-1, 14-2, ... 14-n through the BLE communication nodes 34-1, 34-2, ... 34-n.

The control module 23 may control various aspects of accessing and/or operating the vehicle 12. For example, the control module 23 may include a body control module for controlling various aspects of the access system 20, or an engine control module for controlling various aspects of an engine (not shown) of the vehicle 12. For example, the control module 23 may communicate with the access system 20 and/or the communication system 22 in order to permit or prevent access to the vehicle 12 through the doors 28 and/or to permit or prevent access to the vehicle 12 via the engine of the vehicle 12. For example, the control module 23 may permit or prevent the vehicle access device 14 from operating the engine of the vehicle 12.

Each vehicle access device 14-1, 14-2, ... 14-n may include a mobile communication device such as a smartphone, a smart watch, or a computer (e.g., a tablet, laptop, personal digital assistant, etc.), for example. As illustrated in FIG. 1, in some implementations, the vehicle communication system 10 includes three vehicle access devices 14-1, 14-2, 14-3. It will be appreciated, however, that the vehicle communication system may include more or less than three vehicle access devices 14-1, 14-2, ... 14-n within the scope of the present disclosure. One or more of the vehicle access devices 14-1, 14-2, ... 14-n may be authorized to communicate with the vehicle 12, while another one or more of the vehicle access devices 14-2, 14-3 may not be authorized to communicate with the vehicle 12. In this regard, the first vehicle access device 14-1 may be referred to herein as an authorized vehicle access device 14-1, while the second and third vehicle access device 14-2, 14-3 may be referred to herein as unauthorized vehicle access devices 14-2, 14-3.

The vehicle access devices 14-1, 14-2, ... 14-n may each include a power source 42, a communication application 46, one or more status sensors 48-1, 48-2, ... 48-n, and a wireless communication node 52. The power source 42 may include an internal power source (e.g., a battery) or an external power source (e.g., AC power source) that supplies electrical power to the vehicle access device 14-1, 14-2, . . . 14-n. The communication application 46 may be substantially the same as the communication application 36. In this regard, the communication application 46 may allow the vehicle access device 14-1, 14-2, . . . 14-n to communicate with the vehicle 12 through the wireless communication node 52.

The status sensors 48-1, 48-2, . . . 48-n may sense a status of the vehicle access device 14-1, 14-2, . . . 14-n. For example, one or more of the status sensors 48-1, 48-2, . . . 48-n may sense one or more motion-related characteristics of the vehicle access device 14-1, 14-2, . . . 14-n, such as speed, acceleration, and/or deceleration. In some implementations, a first status sensor 48-1 may include at least one of an accelerometer (e.g., a three-dimensional accelerometer), a gyroscope (e.g., a three-dimensional gyroscope), or a micro-electromechanical system. Another one or more of the status sensors (e.g., second status sensor 48-2) may sense one or more location-related characteristics of the vehicle access device 14-1, 14-2, . . . 14-n, such as global positioning system (GPS) coordinates.

The wireless communication node 52 may communicate with the vehicle 12 or the other vehicle access devices (e.g., 14-n). For example, the wireless communication node 52 may communicate with the wireless communication node(s) 34-1, 34-2, . . . 34-n or another wireless communication node 52, through one or more wireless communication protocols, such as short-range radio wave communication, Wi-Fi, BLUETOOTH®, and/or BLUETOOTH® low energy (BLE). In this regard, the wireless communication node 52 may be referred to herein as BLE communication node 52. The BLE communication node 52 may include a BLE address (e.g., identification number) corresponding to the particular BLE communication node 52.

With reference to FIGS. 2A-2D, a method 100 for mitigating relay station attack and/or preventing communication between the vehicle 12 (e.g., the wireless communication node(s) 34-1, 34-2, . . . 34-n) and one or more of vehicle access devices 14-1, 14-2, . . . 14-n (e.g., the unauthorized vehicle access devices 14-2, 14-3) will now be described.

At step 102, the method 100 may include activating one or more of the vehicle access devices 14-1, 14-2, . . . 14-n. For example, at step 102, an end user (e.g., an authorized user of the vehicle 12) may activate the communication application 46 on the authorized vehicle access device 14-1.

At step 104, the method may include advertising (e.g., transmitting) information from one or more of the vehicle access devices 14-1, 14-2, . . . 14-n. For example, at step 104, the BLE communication node 52 of the authorized vehicle access device 14-1 may advertise BLE packets 60 (FIG. 1). In some implementations, the BLE packets 60 include the transmit power used to transmit the BLE packet 60. The transmit power may include an encrypted transmit power value transmitted by the vehicle access device 14-1 with the BLE packet 60.

At step 106, the method may include searching for and/or receiving information transmitted from a vehicle access device (e.g., authorized vehicle access device 14-1). For example, at step 106, the BLE communication nodes 34-1, 34-2, . . . 34-n on the vehicle 12 may start scanning for BLE packets transmitted from a vehicle access device 14-1, 14-2, . . . 14-n, and/or receive the BLE packet(s) 60 transmitted from a vehicle access device 14-1, 14-2, . . . 14-n.

At step 108, the method may determine whether the BLE packet received by the BLE communication nodes 34-1, 34-2, . . . 34-n has been sent by an authorized vehicle access device (e.g., vehicle access device 14-1). For example, at step 108, the vehicle 12 (e.g., the control module 23) may determine whether the BLE address of the BLE packet corresponds to the authorized vehicle access device 14-1. If the vehicle 12 determines that the BLE address corresponds to an authorized vehicle access device 14-1, the method may proceed to step 110. If the vehicle 12 determines that the BLE address corresponds to an unauthorized vehicle access device (e.g., vehicle access device 14-2, 14-3), the method may return to step 106.

At step 110, the method may include decrypting the transmit power of the BLE packet received from the vehicle access device 14-1, 14-2, . . . 14-n. At step 112, the method may include receiving and/or determining a received single strength indication (RSSI) value (e.g., a calibration value) corresponding to the BLE communication node 52 from which the BLE packet was received. In particular, the BLE communication nodes 34-1, 34-2, . . . 34-n may determine an RSSI value Ra corresponding to the BLE communication node 52 of an unauthorized vehicle access device 14. Determining the RSSI value Ra at step 110 may also include filtering and/or smoothing the RSSI value.

At step 114, the method may include determining an expected RSSI value corresponding to the transmit power associated with the BLE packet 60. In some implementations, the vehicle 12 (e.g., the control module 23) may include a cross-reference 62 (FIG. 1) (e.g., a lookup table) of expected RSSI values corresponding to a plurality of transmit powers for a vehicle access device (e.g., the authorized vehicle access device 14-1). For example, the cross-reference 62 may include a list of expected RSSI values for a corresponding list of transmit powers. In some implementations, for given transmit powers Tx1, Tx2, . . . Txn, the cross-reference 62 may include an expected RSSI value R1, R2, . . . Rn, where each transmit power (e.g., Tx1) corresponds to a single, expected RSSI value (e.g., R1).

At step 116, the method may include determining whether the expected RSSI value R1, R2, . . . Rn corresponds to the RSSI value Ra determined or received at step 112. For example, at step 114, one or more of the BLE communication nodes 34-1, 34-2, . . . 34-n on the vehicle 12 may compare the expected RSSI value R1, R2, . . . Rn, corresponding to the transmit power Tx1, to the RSSI value Ra, corresponding to the BLE communication node 52 from which the BLE packet was sent. If the expected RSSI value R1, R2, . . . Rn is different than the RSSI value Ra, due to, for example, a relay station attack, the method may return to step 106. If the expected RSSI value R1, R2, . . . Rn is equal to the RSSI value Ra, the method may proceed to step 118.

At step 118, the method may include initiating a connection between the vehicle 12 and the vehicle access device 14-1, 14-2, . . . 14-n. For example, at step 118, the BLE communication nodes 34-1, 34-2, . . . 34-n may initiate a wireless connection with the BLE communication node 52 of the vehicle access device 14-1, 14-2, . . . 14-n from which the BLE packet 60 was received.

At step 120, the method may include monitoring the RSSI values (e.g., Ra) received from the vehicle access device 14-1, 14-2, . . . 14-n to which the vehicle 12 was connected at step 118.

At step 122, the method may include transmitting a status of the authorized vehicle access device 14-1 to the vehicle 12. For example, at step 122, the authorized vehicle access device 14-1 may wirelessly transmit a status of the authorized vehicle access device 14-1 to the vehicle 12. In some implementations, the authorized vehicle access device 14-1 transmits a status of one or more of the status sensors 48-1, 48-2, . . . 48-n to the vehicle 12. In this regard, the authorized vehicle access device 14-1 may transmit a movement indicator M1, corresponding to the first sensor 48-1, to the vehicle 12. The movement indicator M1 may identify whether or not the authorized vehicle access device 14-1 is moving.

At step 124, the method may include comparing the RSSI values Ra monitored at step 120 to the movement indicator M1 received at step 122. If the RSSI values Ra are available, due to, for example, a relay station attack, but the movement indicator M1 indicates that the authorized vehicle access device 14-1 is stationary (e.g., not moving), then the vehicle 12 may terminate the connection with the vehicle access device (e.g., vehicle access device 14-2, 14-3) and proceed to step 106. Otherwise, the method may proceed to step 126.

At step 126, the method may include varying the transmit power (e.g., Tx) used to transmit the BLE packet (e.g., BLE packet 60). For example, the BLE node 34-1, 34-2, . . . 34-n of the vehicle 12 may request the vehicle access device, to which the vehicle 12 is connected, to vary the transmit power used to transmit the BLE packet 60, and send the transmit power value (e.g., encrypted transmit power) to the BLE node 34-1, 34-2, . . . 34-n.

At step 128, the method may include determining whether the expected RSSI value (e.g., R1, R2, . . . Rn) corresponds to the RSSI value (e.g., Ra) monitored at step 120. For example, at step 128, one or more of the BLE communication nodes 34-1, 34-2, . . . 34-n on the vehicle 12 may compare the expected RSSI value R1, R2, . . . Rn, corresponding to the varied transmit power(s) received at step 126, to the RSSI value corresponding to the BLE communication node 52 from which the BLE packet was sent. If the expected RSSI values R1, R2, . . . Rn are different than the RSSI value(s) Ra, due to, for example, a relay station attack, the method may return to step 106 and notify the authorized vehicle access device 14-1 of a possible relay station attack. For example, the BLE communication node 34-1, 34-2, . . . 34-n may transmit a relay station attack indicator (e.g., an audio, visual, and/or tactile warning message through the communication application 46) to the authorized vehicle access device 14-1. If the expected RSSI values R1, R2, . . . Rn are equal to the RSSI value(s) Ra, the method may proceed to step 130.

At step 130, the method may include transmitting a status of the authorized vehicle access device 14-1 to the vehicle 12. For example, at step 130, the authorized vehicle access device 14-1 may wirelessly transmit a status of one or more of the status sensors 48-1, 48-2, . . . 48-n to the vehicle 12. In this regard, the second status sensor 48-2 may transmit global positioning system coordinates X1, corresponding to the second sensor 48-2, to the vehicle 12. The global positioning system coordinates X1 may identify the location of the authorized vehicle access device 14-1 relative to the vehicle 12.

At step 132, the method may include comparing a location X2, corresponding to the RSSI values Ra monitored at step 120, to the global positioning system coordinates X1 received at step 130. If the location X2 is different than the location X1, due to, for example, a relay station attack, then the vehicle 12 may terminate the connection with the vehicle access device (e.g., vehicle access device 14-2, 14-3) and proceed to step 106. Otherwise, the method may proceed to step 134.

At step 134, the method may include transmitting information from the vehicle 12 to the authorized vehicle access device 14-1. For example, at step 134, the control module 23 may instruct the monitoring system 21 to capture information and transmit the information to the authorized vehicle access device 14-1. In some implementations, the vehicle 12 transmits information sensed by one or more of the sensors 32-1, 32-2, . . . 32-n to the authorized vehicle access device 14-1. In particular, the one or more of the sensors 32-1, 32-2, . . . 32-n (e.g., a camera) may capture, and transmit, via the BLE node(s) 34-1, 34-2, . . . 34-n (e.g., video-over-BLE), to the authorized vehicle access device 14-1 (e.g., to the BLE node 52), an image (e.g., a photograph) of the area 25 external to the vehicle 12 proximate a door 28 (e.g., a driver's door) of the vehicle 12.

At step 136, the method may include determining whether or not to allow the vehicle 12 to continue communicating with the vehicle access device 14-1, 14-2, . . . 14-n. In this regard, at step 136, the method may include verifying the information transmitted at step 134. For example, at step 136, the end user (e.g., an authorized user) may view the image transmitted at step 134 and verify that the image is an image of the end user. In this regard, the end user may determine whether or not to allow the vehicle 12 to communicate with the vehicle access device 14-1, 14-2, . . . 14-3 based on the image transmitted at step 134. If the end user determines that the vehicle is communicating with one or more of the unauthorized vehicle access devices 14-2, 14-3, the end user may wirelessly transmit a signal from the authorized vehicle access device 14-1 to the vehicle 12, and the method may then return to step 106. In some implementations, the signal may disable certain features of the vehicle 12. For example, the signal may disable the engine of the vehicle 12. If the end user determines that the vehicle 12 is communicating with the authorized vehicle access device 14-1, the method may proceed to step 136 where the vehicle 12 may continue communicating with the authorized vehicle access device 14-1.

With reference to FIGS. 3A-3C, another method 200 for mitigating relay station attack and/or preventing communication between the vehicle 12 (e.g., the wireless communication node(s) 34-1, 34-2, . . . 34-n) and one or more of vehicle access devices 14-1, 14-2, . . . 14-n (e.g., the unauthorized vehicle access devices 14-2, 14-3) will now be described. The method 200 may include any of the steps described in the method 100.

At step 202, the method may include monitoring an RSSI value Rb transmitted from the vehicle 12. For example, at step 202, the method may include monitoring an RSSI value Rb transmitted from one or more of the BLE nodes 34-1, 34-2, . . . 34-n. In some implementations, the BLE node 52 of the authorized vehicle access device 14-1 may receive and monitor the RSSI value Rb transmitted from the BLE nodes 34-1, 34-2, . . . 34-n.

At step 204, the method may include instructing one of the BLE nodes 34-1, 34-2, . . . 34-n to send a BLE packet (e.g., BLE packet 60) at various transmit power levels (e.g., Tx). For example, the BLE node 34-1 may instruct the other BLE nodes 34-2, 34-3, . . . 34-n to transmit BLE packets at various power levels. In some implementations, the transmit power level includes an unrepeatable transmit power level, such that the transmit power level cannot be replicated by a BLE node of an unauthorized vehicle access device 14-2, 14-3.

At step 206, the method may include assessing the location of the authorized vehicle access device 14-1. For example, at 206, the BLE node 34-1 may assess the location of the authorized vehicle access device 14-1 relative to the vehicle 12. In some implementations, the BLE node 34-1 may determine the distance D of the authorized vehicle access device 14-1 from the vehicle 12.

At step 208, the method may include determining whether the distance D of the vehicle access device 14-1 is less than or equal to a predetermined distance. For example, at step 208, the BLE node 34-1 may determine whether the distance D is less than fifty (50) meters. If step 208 is false, the method may return to step 204. If step 208 is true, the method may proceed to step 210.

At step 210, the method may include instructing all of the BLE nodes 34-1, 34-2, . . . 34-n to advertise BLE packets (e.g., BLE packets 60). For example, the BLE nodes 34-1 may instruct all of the other BLE nodes 34-2, 34-3, . . . 34-n to advertise BLE packets.

At step 212, the method may include receiving all of the BLE packets transmitted at step 210. For example, at step 212, the BLE node 52 of the vehicle access device 14-1 may receive the BLE packets transmitted at step 210.

At step 214, the method may include gathering, filtering, or deriving RSSI values (e.g., Ra) corresponding to the BLE packets received at step 212. For example, the BLE node 52 may gather, filter, or derive RSSI values corresponding to the BLE packets received at step 212 from each of the BLE nodes 34-2, 34-3, . . . 34-n.

At step 216, the method may include transmitting the RSSI values derived at step 216 to the vehicle 12. For example, the BLE node 52 of the vehicle access device 14-1 may transmit the derived RSSI value corresponding to each BLE node 34-1, 34-2, . . . 34-n back to the BLE node 34-1 of the vehicle 12.

At step 218, the method may include evaluating the RSSI values received at step 216. For example, the BLE node 34-1 may evaluate the RSSI values received at step 216 by determining the highest RSSI values derived by the BLE node 52 at step 214. In some implementations, the BLE node 34-1 determines which BLE nodes 34-2, 34-3, . . . 34-n correspond to the highest RSSI values derived by the BLE node 52 at step 214. For example, the BLE node 34-1 may determine which BLE nodes 34-2, 34-3, . . . 34-n correspond to the three highest RSSI values derived by the BLE node 52 at step 214.

At step 220, the method may include transmitting a BLE packet (e.g., BLE packet 60) from each of the BLE nodes 34-2, 34-3, . . . 34-n corresponding to the highest RSSI values determined at step 218. In some implementations, each of the BLE nodes 34-2, 34-3, . . . 34-n corresponding to the highest RSSI values determined at step 218 may transmit a BLE packet at a unique transmit power level (e.g., transmit power Tx). For example, each of the BLE nodes 34-2, 34-3, . . . 34-n corresponding to the highest RSSI values determined at step 218 may receive a command from the BLE node 34-1 to transmit a BLE packet at a unique transmit power level, such that each of the BLE nodes 34-2, 34-3, . . . 34-n corresponding to the highest RSSI values determined at step 218 transmits a BLE packet at a transmit power level that is different than the transmit power level of the BLE packet transmitted by each of the other BLE nodes 34-2, 34-3, . . . 34-n corresponding to the highest RSSI values determined at step 218.

At step 222, the method may include transmitting a derived RSSI value from the authorized vehicle access device 14-1 to the vehicle 12. For example, the BLE node 52 may transmit a derived RSSI for each of the BLE nodes 34-2, 34-3, . . . 34-n corresponding to the highest RSSI values determined at step 218. In some implementations, the BLE node 52 may transmit each of the derived RSSI values to the BLE node 34-1.

At step 224, the method may include transmitting a BLE packet (e.g., BLE packet 60) from each of the BLE nodes 34-2, 34-3, . . . 34-n corresponding to the highest RSSI values determined at step 218. In some implementations, each of the BLE nodes 34-2, 34-3, . . . 34-n corresponding to the highest RSSI values determined at step 218 may transmit a BLE packet at a unique transmit power level (e.g., transmit power Tx). For example, each of the BLE nodes 34-2, 34-3, . . . 34-n corresponding to the highest RSSI values determined at step 218 may receive a command from the BLE node 34-1 to transmit a BLE packet at a unique transmit power level, such that each of the BLE nodes 34-2, 34-3, . . . 34-n corresponding to the highest RSSI values determined at step 218 transmits a BLE packet at a transmit power level that is different than the transmit power level of the BLE packet transmitted by each of the other BLE nodes 34-2, 34-3, . . . 34-n corresponding to the highest RSSI values determined at step 218. The transmit power of the BLE packet transmitted from each of the BLE nodes 34-2, 34-3, . . . 34-n at step 224 may be different than the transmit power of the BLE packet transmitted from each of the corresponding BLE nodes 34-2, 34-3, . . . 34-n at step 220. In this regard, the BLE node 34-1 may instruct each of the BLE nodes 34-2, 34-3, . . . 34-n corresponding to the highest RSSI values determined at step 218 to vary the transmit power Tx of the BLE packets transmitted at step 224.

Each of the BLE packets transmitted at step 224 may include an encrypted packet data unit or an encrypted portion of a packet data unit. The encrypted packet data unit, or portion thereof, may include unique information derived from a parameter known by one or more of the BLE nodes 34-1, 34-2, . . . 34-n. For example, the encrypted packet data unit or encrypted portion thereof may include a random number known only by one or more of the BLE nodes 34-1, 34-2, . . . 34-n.

At 226, the method may include receiving the RSSI value corresponding to the vehicle access device 14-1, 14-2, . . . 14-n. For example, the BLE node 34-1 may receive and monitor the RSSI of the vehicle access device 14-1, 14-2, . . . 14-n with which the BLE node 34-1 is communicating.

With this strategy, it will be difficult to clone or perform a "man in the middle" attack in an effort to fool the system. While an adversary may be able clone up to the level of copying the ADD of the BLE node(s) that advertises, it will be difficult for the adversary to also clone the contents of the portion of the PDU that is encrypted and unique only to the BLE node in the vehicle.

What is claimed is:

1. A system for mitigating relay station attack, the system comprising:
   a first wireless communication node operable to transmit data including an encrypted transmit power value;
   a second wireless communication node operable to:
   receive the data;
   decrypt the encrypted transmit power value;
   determine a received signal strength indication value of the data; and
   compare the received signal strength indication value to the decrypted transmit power value; and
   prevent communication between the first wireless communication node and the second wireless communication node based on the comparison between the received signal strength indication value and the decrypted transmit power value.

2. The system of claim 1, wherein the first wireless communication node includes a first BLUETOOTH® low energy node, and the second wireless communication node includes a second BLUETOOTH® low energy node.

3. The system of claim 1, further comprising a vehicle access device having the first wireless communication node.

4. The system of claim 3, further comprising a vehicle having the second wireless communication node.

5. The system of claim 4, wherein the vehicle includes a sensor operable to sense a condition in an area external to the vehicle and transmit the condition to a wireless communication node.

6. The system of claim 5, wherein the sensor includes a camera.

7. The system of claim 3, further comprising a first sensor operable to transmit a first status of the vehicle access device to the second wireless communication node.

8. The system of claim 7, wherein the first sensor includes one of an accelerometer, a gyroscope, and a micro-electromechanical system.

9. The system of claim 7, wherein the first status includes one of a speed and an acceleration of the vehicle access device.

10. The system of claim 3, wherein the first wireless communication node is operable to vary the value of the encrypted transmit power.

11. The system of claim 3, further comprising a second sensor operable to transmit a second status of the vehicle access device to the second wireless communication node.

12. The system of claim 11, wherein the second status includes a location of the vehicle access device.

13. The system of claim 11, wherein the second sensor includes a global positioning system sensor.

14. A method for mitigating relay station attack, the method comprising:
   transmitting data, including an encrypted transmit power value, from a first wireless communication node;
   receiving the data at a second wireless communication node;
   decrypting the encrypted transmit power value;
   determining a received signal strength indication value of the data;
   comparing the received signal strength indication value to the decrypted transmit power value; and
   controlling communication between the first wireless communication node and the second wireless communication node based on the comparison between the received signal strength indication value and the decrypted transmit power value.

15. The method of claim 14, wherein transmitting data from a first wireless communication node includes transmitting data from a first BLUETOOTH® low energy node, and receiving data at a second wireless communication node includes receiving data at a second BLUETOOTH® low energy node.

16. The method of claim 14, wherein transmitting data from a first wireless communication node includes transmitting data from a first wireless communication node associated with a vehicle access device.

17. The method of claim 16, wherein receiving data at a second wireless communication node includes receiving data at a second wireless node associated with a vehicle.

18. The method of claim 17, further comprising sensing a condition in an area external to the vehicle and transmitting the condition to a wireless communication node.

19. The method of claim 18, wherein sensing a condition in an area external to the vehicle includes photographing the area external to the vehicle.

20. The method of claim 16, further comprising determining one of a speed and an acceleration of the vehicle access device.

21. The method of claim 16, further comprising varying the value of the encrypted transmit power.

22. The method of claim 16, further comprising transmitting a second status of the vehicle access device to the second wireless communication node.

23. The method of claim 22, wherein transmitting a second status of the vehicle access device includes transmitting a location of the vehicle access device.

* * * * *